US012574342B2

(12) United States Patent
Chen

(10) Patent No.: US 12,574,342 B2
(45) Date of Patent: Mar. 10, 2026

(54) PROCESSING METHOD, DEVICE AND NON-TRANSITORY COMPUTER-READABLE STORAGE MEDIUM FOR INSTANT MESSAGING GROUP

(71) Applicant: Beijing Zitiao Network Technology Co., Ltd., Beijing (CN)

(72) Inventor: Fangjia Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 112 days.

(21) Appl. No.: 18/573,409

(22) PCT Filed: Sep. 27, 2022

(86) PCT No.: PCT/CN2022/121758
§ 371 (c)(1),
(2) Date: Dec. 21, 2023

(87) PCT Pub. No.: WO2023/051533
PCT Pub. Date: Apr. 6, 2023

(65) Prior Publication Data
US 2024/0291781 A1 Aug. 29, 2024

(30) Foreign Application Priority Data

Sep. 29, 2021 (CN) .......................... 202111151843.8

(51) Int. Cl.
*G06F 15/16* (2006.01)
*G06F 3/0488* (2022.01)
(Continued)

(52) U.S. Cl.
CPC ............ *H04L 51/04* (2013.01); *G06F 3/0488* (2013.01); *H04L 51/212* (2022.05)

(58) Field of Classification Search
CPC ....... H04L 51/04; H04L 51/212; H04L 51/48; H04L 12/185; G06F 3/0488
See application file for complete search history.

(56) References Cited

U.S. PATENT DOCUMENTS

2010/0146065 A1* 6/2010 Zhu ...................... G06Q 10/107
709/206
2013/0173798 A1* 7/2013 Micucci .................. H04L 63/10
709/225
(Continued)

FOREIGN PATENT DOCUMENTS

CN 102299810 A 12/2011
CN 103428007 A 12/2013
(Continued)

OTHER PUBLICATIONS

International Patent Application No. PCT/CN2022/121758; Int'l Search Report; dated Dec. 27, 2022; 2 pages.
(Continued)

*Primary Examiner* — John B Walsh
(74) *Attorney, Agent, or Firm* — BakerHostetler

(57) ABSTRACT

The disclosure provides a processing method, device, and non-transitory computer-readable storage medium for an instant messaging group, the method comprising: changing attribute information of the instant messaging group in response to a trigger operation on the instant messaging group; wherein the attribute information of the instant messaging group comprises: an internal group and an external group; the changing attribute information of the instant messaging group comprises: converting an internal group to an external group, or converting an external group to an internal group; responding to an operation on the instant messaging group based on the attribute information of the instant messaging group.

20 Claims, 9 Drawing Sheets

(51) Int. Cl.
 H04L 51/04 (2022.01)
 H04L 51/212 (2022.01)

(56) References Cited

U.S. PATENT DOCUMENTS

| 2013/0174275 A1 | 7/2013 | Micucci et al. |
|---|---|---|
| 2017/0177135 A1* | 6/2017 | Sarin .................. G06F 3/04847 |
| 2019/0363843 A1* | 11/2019 | Gordaychik ........ H04W 72/044 |
| 2020/0196111 A1* | 6/2020 | Yang ................ H04M 3/42382 |

FOREIGN PATENT DOCUMENTS

| CN | 108111401 A | 6/2018 |
|---|---|---|
| CN | 108173738 A | 6/2018 |
| CN | 109428737 A | 3/2019 |
| CN | 109495283 A | 3/2019 |
| CN | 109587044 A | 4/2019 |
| CN | 111901132 A | 11/2020 |
| CN | 113794627 A | 12/2021 |
| JP | 2004-246537 A | 9/2004 |

OTHER PUBLICATIONS

"Gitee has now increased WebHook's support for enterprise WeChat." https://zhuanlan.zhihu.com/p/118395826; Mar. 2020; accessed May 23, 2023; 8 pages.

* cited by examiner

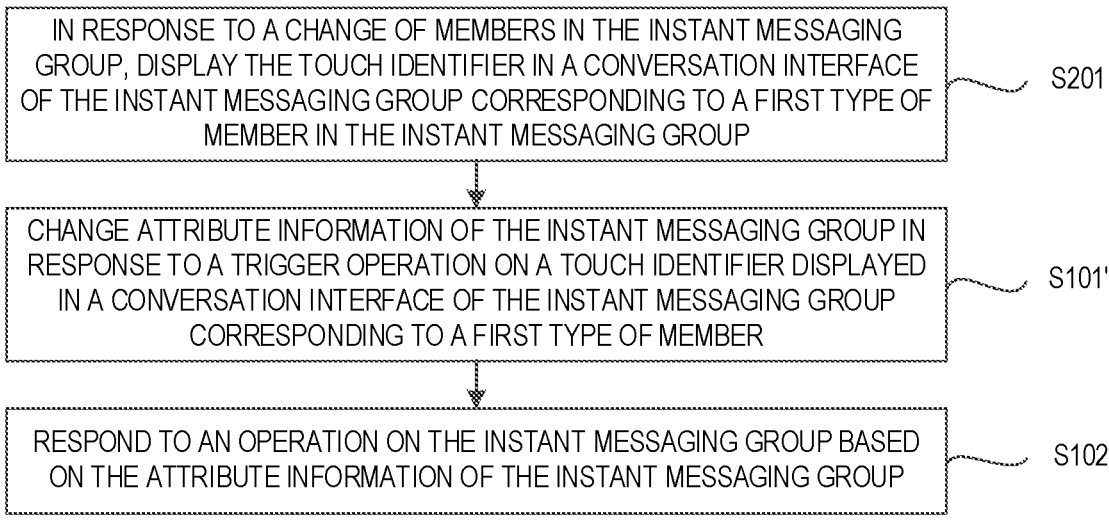

IN RESPONSE TO A CHANGE OF MEMBERS IN THE INSTANT MESSAGING GROUP, DISPLAY THE TOUCH IDENTIFIER IN A CONVERSATION INTERFACE OF THE INSTANT MESSAGING GROUP CORRESPONDING TO A FIRST TYPE OF MEMBER IN THE INSTANT MESSAGING GROUP ⟶ S201

CHANGE ATTRIBUTE INFORMATION OF THE INSTANT MESSAGING GROUP IN RESPONSE TO A TRIGGER OPERATION ON A TOUCH IDENTIFIER DISPLAYED IN A CONVERSATION INTERFACE OF THE INSTANT MESSAGING GROUP CORRESPONDING TO A FIRST TYPE OF MEMBER ⟶ S101'

RESPOND TO AN OPERATION ON THE INSTANT MESSAGING GROUP BASED ON THE ATTRIBUTE INFORMATION OF THE INSTANT MESSAGING GROUP ⟶ S102

FIG. 7

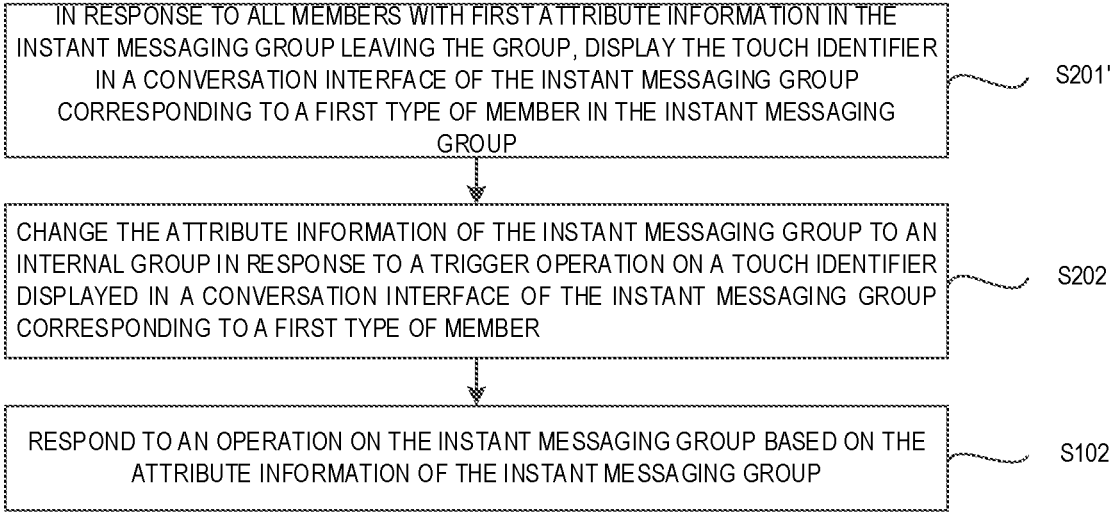

IN RESPONSE TO ALL MEMBERS WITH FIRST ATTRIBUTE INFORMATION IN THE INSTANT MESSAGING GROUP LEAVING THE GROUP, DISPLAY THE TOUCH IDENTIFIER IN A CONVERSATION INTERFACE OF THE INSTANT MESSAGING GROUP CORRESPONDING TO A FIRST TYPE OF MEMBER IN THE INSTANT MESSAGING GROUP ⟶ S201'

CHANGE THE ATTRIBUTE INFORMATION OF THE INSTANT MESSAGING GROUP TO AN INTERNAL GROUP IN RESPONSE TO A TRIGGER OPERATION ON A TOUCH IDENTIFIER DISPLAYED IN A CONVERSATION INTERFACE OF THE INSTANT MESSAGING GROUP CORRESPONDING TO A FIRST TYPE OF MEMBER ⟶ S202

RESPOND TO AN OPERATION ON THE INSTANT MESSAGING GROUP BASED ON THE ATTRIBUTE INFORMATION OF THE INSTANT MESSAGING GROUP ⟶ S102

FIG. 8

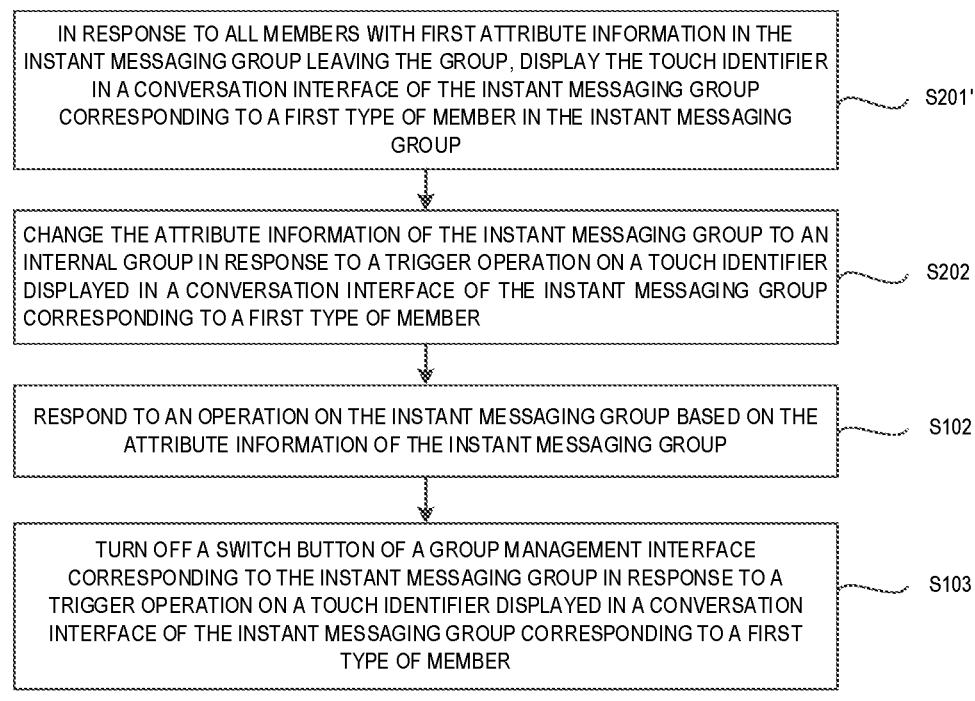

IN RESPONSE TO ALL MEMBERS WITH FIRST ATTRIBUTE INFORMATION IN THE INSTANT MESSAGING GROUP LEAVING THE GROUP, DISPLAY THE TOUCH IDENTIFIER IN A CONVERSATION INTERFACE OF THE INSTANT MESSAGING GROUP CORRESPONDING TO A FIRST TYPE OF MEMBER IN THE INSTANT MESSAGING GROUP ~ S201'

CHANGE THE ATTRIBUTE INFORMATION OF THE INSTANT MESSAGING GROUP TO AN INTERNAL GROUP IN RESPONSE TO A TRIGGER OPERATION ON A TOUCH IDENTIFIER DISPLAYED IN A CONVERSATION INTERFACE OF THE INSTANT MESSAGING GROUP CORRESPONDING TO A FIRST TYPE OF MEMBER ~ S202

RESPOND TO AN OPERATION ON THE INSTANT MESSAGING GROUP BASED ON THE ATTRIBUTE INFORMATION OF THE INSTANT MESSAGING GROUP ~ S102

TURN OFF A SWITCH BUTTON OF A GROUP MANAGEMENT INTERFACE CORRESPONDING TO THE INSTANT MESSAGING GROUP IN RESPONSE TO A TRIGGER OPERATION ON A TOUCH IDENTIFIER DISPLAYED IN A CONVERSATION INTERFACE OF THE INSTANT MESSAGING GROUP CORRESPONDING TO A FIRST TYPE OF MEMBER ~ S103

FIG. 9

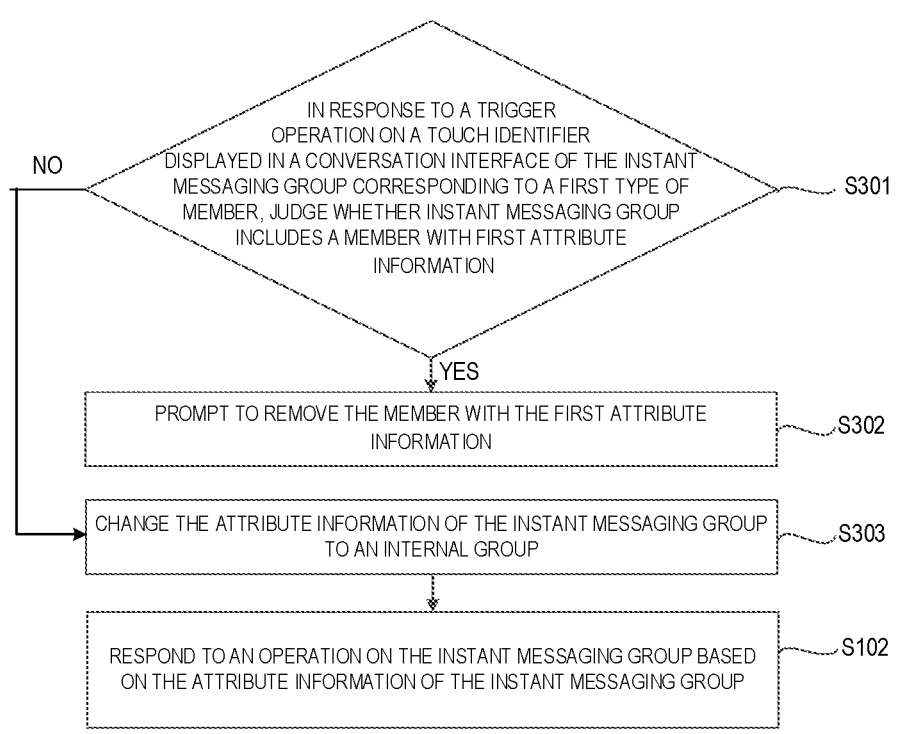

IN RESPONSE TO A TRIGGER OPERATION ON A TOUCH IDENTIFIER DISPLAYED IN A CONVERSATION INTERFACE OF THE INSTANT MESSAGING GROUP CORRESPONDING TO A FIRST TYPE OF MEMBER, JUDGE WHETHER INSTANT MESSAGING GROUP INCLUDES A MEMBER WITH FIRST ATTRIBUTE INFORMATION ~ S301

NO

YES

PROMPT TO REMOVE THE MEMBER WITH THE FIRST ATTRIBUTE INFORMATION ~ S302

CHANGE THE ATTRIBUTE INFORMATION OF THE INSTANT MESSAGING GROUP TO AN INTERNAL GROUP ~ S303

RESPOND TO AN OPERATION ON THE INSTANT MESSAGING GROUP BASED ON THE ATTRIBUTE INFORMATION OF THE INSTANT MESSAGING GROUP ~ S102

FIG. 10

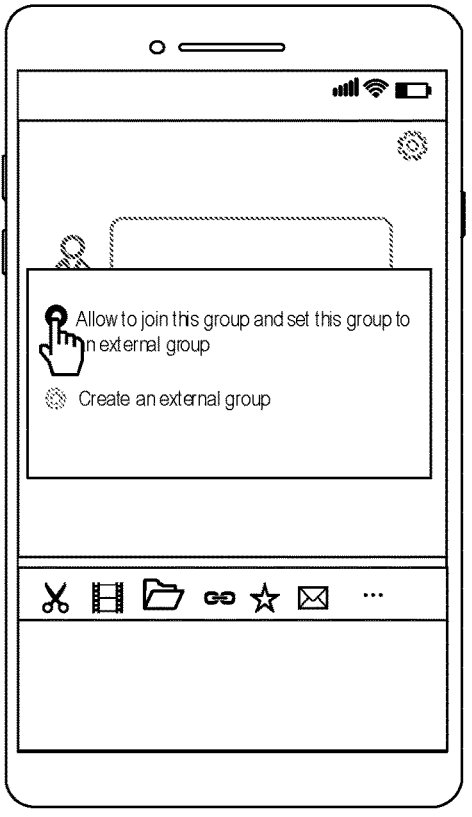

FIG. 15

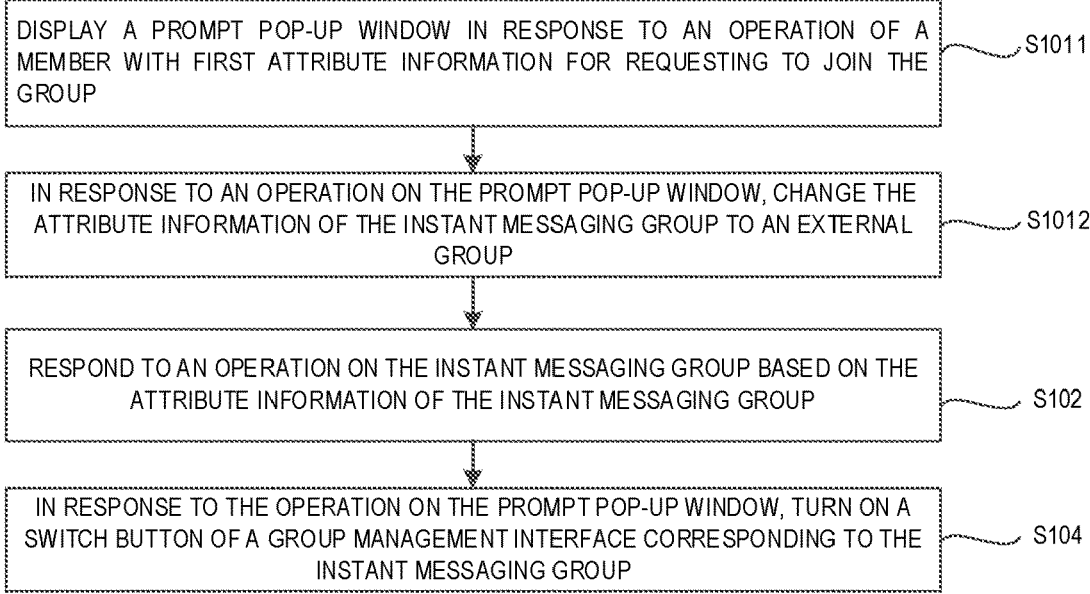

| | |
|---|---|
| DISPLAY A PROMPT POP-UP WINDOW IN RESPONSE TO AN OPERATION OF A MEMBER WITH FIRST ATTRIBUTE INFORMATION FOR REQUESTING TO JOIN THE GROUP | S1011 |
| IN RESPONSE TO AN OPERATION ON THE PROMPT POP-UP WINDOW, CHANGE THE ATTRIBUTE INFORMATION OF THE INSTANT MESSAGING GROUP TO AN EXTERNAL GROUP | S1012 |
| RESPOND TO AN OPERATION ON THE INSTANT MESSAGING GROUP BASED ON THE ATTRIBUTE INFORMATION OF THE INSTANT MESSAGING GROUP | S102 |
| IN RESPONSE TO THE OPERATION ON THE PROMPT POP-UP WINDOW, TURN ON A SWITCH BUTTON OF A GROUP MANAGEMENT INTERFACE CORRESPONDING TO THE INSTANT MESSAGING GROUP | S104 |

FIG. 16

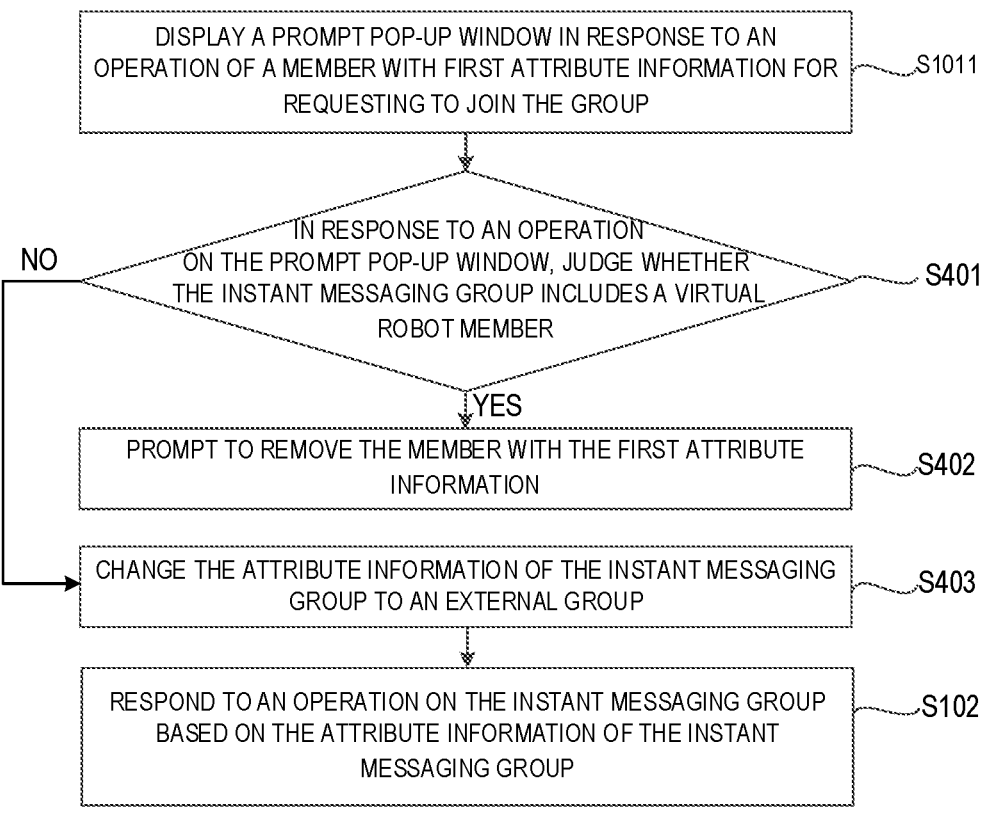

DISPLAY A PROMPT POP-UP WINDOW IN RESPONSE TO AN OPERATION OF A MEMBER WITH FIRST ATTRIBUTE INFORMATION FOR REQUESTING TO JOIN THE GROUP ⌐~S1011

IN RESPONSE TO AN OPERATION ON THE PROMPT POP-UP WINDOW, JUDGE WHETHER THE INSTANT MESSAGING GROUP INCLUDES A VIRTUAL ROBOT MEMBER ~ S401

NO

YES

PROMPT TO REMOVE THE MEMBER WITH THE FIRST ATTRIBUTE INFORMATION ~S402

CHANGE THE ATTRIBUTE INFORMATION OF THE INSTANT MESSAGING GROUP TO AN EXTERNAL GROUP ~S403

RESPOND TO AN OPERATION ON THE INSTANT MESSAGING GROUP BASED ON THE ATTRIBUTE INFORMATION OF THE INSTANT MESSAGING GROUP ~S102

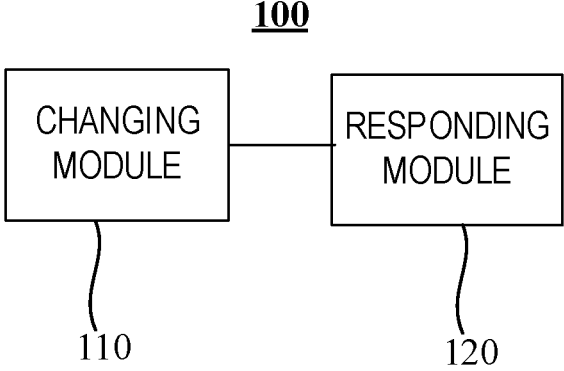

CHANGING MODULE     RESPONDING MODULE 110     120

FIG. 18

PROCESSING METHOD, DEVICE AND NON-TRANSITORY COMPUTER-READABLE STORAGE MEDIUM FOR INSTANT MESSAGING GROUP

CROSS-REFERENCE TO RELATED APPLICATION(S)

This application is a U.S. National Stage Application of PCT Application No. PCT/CN2022/121758 filed Sep. 27, 2022, which claims priority to Chinese Application No. 202111151843.8 entitled "Processing Method, Apparatus, Device and Storage Medium for Instant Messaging Group" filed on Sep. 29, 2021, the disclosures of which are incorporated herein by reference in their entities.

FIELD

Implementations of the present disclosure relate to the field of computer technology, and in particular, to a processing method, apparatus, device, and storage medium for an instant messaging group.

BACKGROUND

With the popularity of instant messaging tools, users will use different functions in instant messaging tools when using them. For example, in order to facilitate communication between multiple users, a multi-user instant messaging group can be established, and information sharing can be achieved within the instant messaging group.

In the prior art, whether to create an internal group or an external group is determined depending on whether users to be included in the group when creating the instant messaging group are cross-tenant. Once the instant messaging group is created, attribute information of the instant messaging group is determined as an internal group or an external group.

However, it is impossible to change the attribute information of the instant messaging group with the prior art.

SUMMARY

The present disclosure provides a processing method, apparatus, device, and storage medium for an instant messaging group, which enables a conversion of attribute information of an instant messaging group.

In a first aspect, the present disclosure provides a processing method for an instant messaging group, comprising:

changing attribute information of the instant messaging group in response to a trigger operation on the instant messaging group;

wherein the attribute information of the instant messaging group comprises: an internal group and an external group; the changing attribute information of the instant messaging group comprises: converting an internal group to an external group, or converting an external group to an internal group;

responding to an operation on the instant messaging group based on the attribute information of the instant messaging group.

In a second aspect, the present disclosure provides a processing apparatus for an instant messaging group, comprising:

a changing module, used for changing attribute information of the instant messaging group in response to a trigger operation on the instant messaging group;

wherein the attribute information of the instant messaging group comprises: an internal group and an external group; the changing attribute information of the instant messaging group comprises: converting an internal group to an external group, or converting an external group to an internal group;

a responding module, used for responding to an operation on the instant messaging group based on the attribute information of the instant messaging group.

In a third aspect, the present disclosure provides an electronic device, comprising: a processor for executing a computer program stored in a memory, the computer program being executed by the processor to implement the steps of the first aspect.

In a fourth aspect, the present disclosure provides a computer-readable storage medium having a computer program stored thereon, characterized in that the computer program, when executed by a processor, implements the steps of any of the first aspects.

In a fifth aspect, the present disclosure provides a computer program product, characterized in that, when the computer program product is run on a computer, causes the computer to perform steps of implementing the method of any of the first aspects.

It would be appreciated that the content described in the Summary section of the present invention is neither intended to identify key or essential features of the implementations of the present disclosure, nor is it intended to limit the scope of the present disclosure. Other features of the present disclosure will be readily envisaged through the following description.

BRIEF DESCRIPTION OF THE DRAWINGS

The accompanying drawings here are incorporated into the specification and constitute a part of this specification, which illustrate embodiments that conform to the present disclosure and which are used together with the specification to explain the principles of the present disclosure.

In order to more clearly illustrate the technical solutions in the embodiments of the present disclosure or the prior art, a brief introduction is presented below to the drawings to be used in the description of the embodiments or the prior art. Obviously, those of ordinary skill in the art may further obtain other drawings from the accompanying drawings without the exercise of inventive skill.

FIG. 7 illustrates a schematic flowchart of a further processing method for an instant messaging group provided by the present disclosure;

FIG. 8 illustrates a schematic flowchart of a further processing method for an instant messaging group provided by the present disclosure;

FIG. 9 illustrates a schematic flowchart of a further processing method for an instant messaging group provided by the present disclosure;

FIG. 10 illustrates a schematic flowchart of a further processing method for an instant messaging group provided by the present disclosure;

FIG. 15 illustrates a schematic diagram of a further conversation interface of an instant messaging group provided by the present disclosure;

FIG. 16 illustrates a schematic flowchart of a further processing method for an instant messaging group provided by the present disclosure;

FIG. 17 illustrates a schematic flowchart of a further processing method for an instant messaging group provided by the present disclosure;

FIG. 18 illustrates a schematic diagram of a processing apparatus for an instant messaging group provided by the present disclosure.

DETAILED DESCRIPTION

Figure 1:
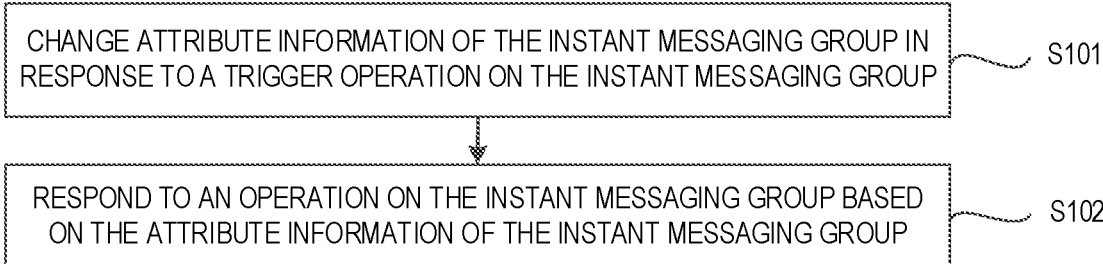
FIG. 1 illustrates a schematic flowchart of a processing method for an instant messaging group provided by the present disclosure.

In order to better understand the above objects, features, and advantages of the present disclosure, the following will further describe the disclosed solutions. It should be noted that, without conflict, the embodiments of the present disclosure and the features in the embodiments may be combined with each other.

Many specific details are set forth in the following description in order to fully understand the present disclosure, but the present disclosure may also be implemented in other ways different from those described herein; obviously, the embodiments in the specification are only part of the embodiments of the present disclosure, not all embodiments.

The disclosed technical solution may be applied to electronic devices, which may be computers, tablets, mobile phones, or other intelligent terminal devices. The electronic device has a display screen, which can be a touch screen or a non-touch screen. For electronic devices with a touch screen, users may interact with the electronic device through gestures, fingers, or touch tools (such as a stylus). For non-touch screen electronic devices, interaction with the electronic device may be achieved through external devices (such as a mouse, keyboard, or camera) or automatic speech recognition or expression recognition.

The technical solution of the present disclosure can be applied to instant messaging applications, where multi-people instant messaging groups can be established. The attribute information of the instant messaging group in e present disclosure can include internal groups and external groups. For example, if the attribute information of instant messaging group A is an internal group, it means that all members in instant messaging group A are employees of the same enterprise, that is, belong to the same tenant. If the attribute information of instant messaging group A is an external group, it means that the members in instant messaging group A are employees of multiple enterprises, that is, belong to different tenants. In the present disclosure, the attribute information of the instant messaging group can be changed from an internal group to an external group, or from an external group to an internal group.

The attribute information of members in the instant messaging group in the present disclosure can include external members and internal members. Here, external members and internal members can be determined with reference to the group owner of the instant messaging group. For example, based on the above embodiment, the group owner of instant messaging group A belongs to tenant M, the members belonging to tenant M in instant messaging group A are internal members, and the members belonging to other tenants are external members.

In the present disclosure, in response to a trigger operation on the instant messaging group, the attribute information of the instant messaging group is changed, wherein the attribute information of the instant messaging group includes: an internal group and an external group; changing the attribute information of the instant messaging group includes: converting the internal group into an external group, or converting the external group into an internal group; based on the attribute information of the instant messaging group, responding to the operation on the instant messaging group can achieve mutual conversion between the internal group and the external group, so that the attribute information of the instant messaging group can be flexibly converted, which is convenient for managing the instant messaging group.

A detailed description of the technical solution of the present disclosure is presented below with several specific embodiments.

FIG. 1 is a schematic flowchart of a processing method for an instant messaging group provided by the present disclosure. As depicted, the method comprises:

S101: in response to a trigger operation on the instant messaging group, changing attribute information of the instant messaging group.

The attribute information of the instant messaging group includes: an internal group and an external group, and changing the attribute information of the instant messaging group includes: converting an internal group to an external group, or converting an external group to an internal group.

The attribute information of the instant messaging group can be an external group or an internal group. The attribute information of the members in the instant messaging group can be external or internal members, and the attribute information of the members in the instant messaging group can be determined based on the identity information of a group owner of the instant messaging group. For example, the group owner of instant messaging group A belongs to tenant M, the members belonging to tenant M in instant messaging group A are internal members, and the members belonging to other tenants in instant messaging group A are external members.

Based on the above embodiment, if the attribute information of the instant messaging group is an internal group, the members in the instant messaging group are all internal members. If the attribute information of the instant messaging group is an external group, the members in the instant messaging group can include external members. For example, if the attribute information of the instant messaging group is an external group, when all members in the instant messaging group are internal members, the attribute information of the instant messaging group can be changed from an external group to an internal group. For example, the attribute information of the instant messaging group is an internal group. When external members need to be added to the instant messaging group, the attribute information of the instant messaging group can be changed from an internal group to an external group.

Figure 2:
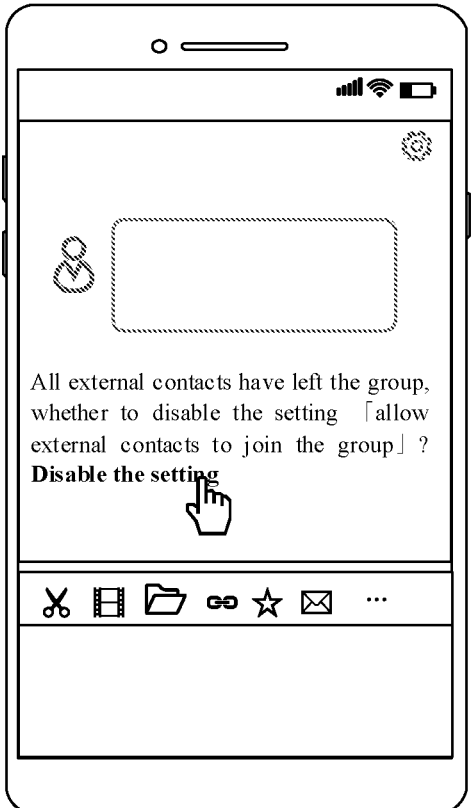
FIG. 2 illustrates a schematic diagram of a conversation interface of an instant messaging group provided by the present disclosure.
Figure 3:
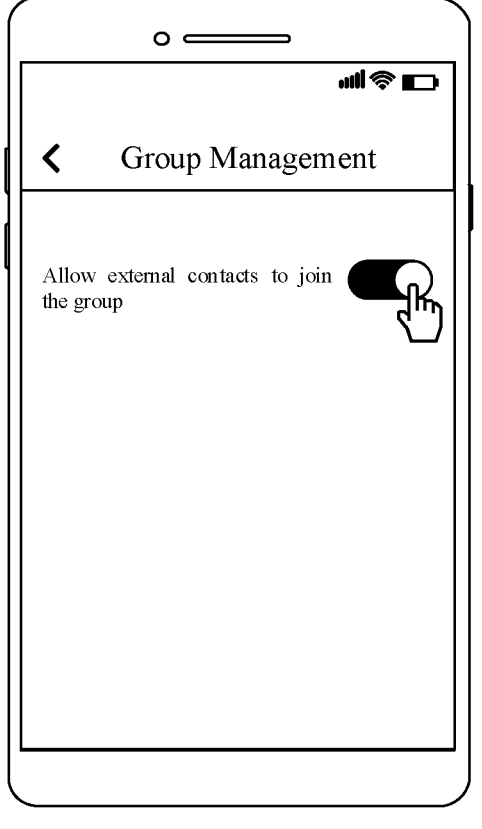
FIG. 3 illustrates a schematic diagram of a group management interface of an instant messaging group provided by the present disclosure.

As an example, FIG. 2 is a schematic diagram of A conversation interface of an instant messaging group provided by the present disclosure, and FIG. 3 is a schematic diagram of a group management interface of an instant messaging group provided by the present disclosure. The conversation interface of the instant messaging group can be as shown in FIG. 2, and a touch identifier is displayed in the conversation interface. For example, the touch identifier can be "off setting", and the attribute information of the instant messaging group can be changed by triggering the touch identifier. The group management interface of the instant messaging group can be as shown in FIG. 3, and a switch button is displayed in the group management interface. By triggering the switch button, the attribute information of the instant messaging group can be changed. This embodiment does not specifically limit the operation of triggering the change of the attribute information of the instant messaging group.

S102: responding to an operation on the instant messaging group based on the attribute information of the instant messaging group.

The operation on the instant messaging group can include, but not limited to: adding new members to the instant messaging group; sharing the instant messaging group; and joining the instant messaging group through the sharing of other members.

For example, the attribute information of instant messaging group A is an internal group. During the process of adding new members to instant messaging group A, if member N to be added is an internal member, N can be added to instant messaging group A. After N is added to instant messaging group A, the attribute information of instant messaging group A is still an internal group. If member N to be added is an external member and instant messaging group A is a super large group, new members cannot be added. If member N to be added is an external member and instant messaging group A is a non-super large group, and the operation of adding new members is performed by non-administrators of instant messaging group A, non-administrators of instant messaging group A can be prompted to establish a new instant messaging group. Non-administrators of instant messaging group A can establish a new instant messaging group B, and the attribute information of instant messaging group B is an external group. If member N to be added is an external member, instant messaging group A is a non-super large group, and the operation of adding new members is performed by the administrator of instant messaging group A, a new instant messaging group B can be directly established, and the attribute information of instant messaging group B is an external group. Alternatively, after removing the virtual robot members in instant messaging group A, the attribute information of instant messaging group A can be converted from an internal group to an external group, and N can be added to instant messaging group A.

As an example, the attribute information of instant messaging group A is an internal group, and the members of instant messaging group A all belong to tenant M.

During the process of sharing instant messaging group A by members in instant messaging group A to other objects, if it is determined that the object to be shared is a member of another tenant, the sharing fails, and the administrator of instant messaging group A is prompted to change the attribute information of instant messaging group A. If it is determined that the object to be shared is a member of tenant M, the sharing succeeds.

As an example, all members of instant messaging group A belong to tenant M. During the process that pending group member N' joins instant messaging group A by sharing, if the attribute information of instant messaging group A is an external group but the shared information is invalid, pending group member N' fails to join the group and is prompted that he/she is unable to join instant messaging group A. If the attribute information of instant messaging group A is an external group and the shared information is valid, after passing the group verification, pending group member N' successfully joins the group. If the attribute information of instant messaging group A is an internal group and pending group member N' belongs to tenant M, and the member of instant messaging group A who shares instant messaging group to pending group member N' has the permission to invite other members to join the group, pending group member N' joins the group successfully. If the attribute information of instant messaging group A is an internal group and pending group member N' belongs to another tenant, pending group member N' fails to join the group and is prompted that he/she is unable to join instant messaging group A.

Figure 4:
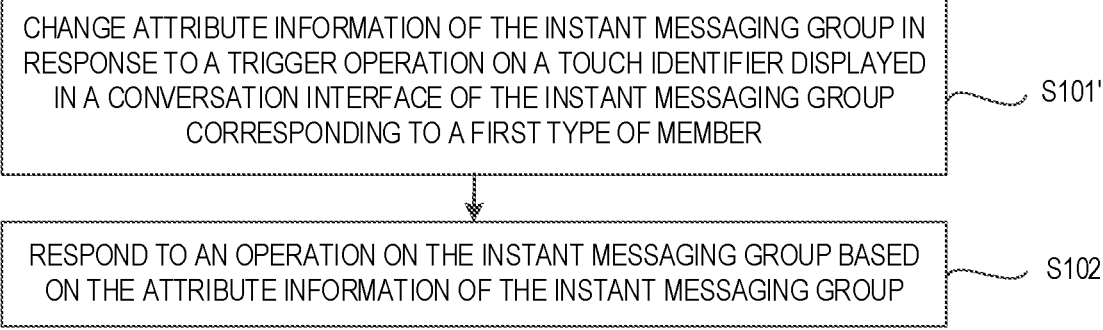
FIG. 4 illustrates a schematic flowchart of a further processing method for an instant messaging group provided by the present disclosure.

FIG. 4 is a schematic flowchart of a further processing method for an instant messaging group provided by the present disclosure. FIG. 4 is a specific description of a possible implementation when executing S101 based on the embodiment shown in FIG. 1.

S101': in response to the trigger operation of the touch identifier displayed on the conversation interface of the instant messaging group corresponding to a first type of member, changing the attribute information of the instant messaging group.

The touch identifier is used for indicating that the attribute information of the instant messaging group is to be changed, and the first type of member includes: a group owner and/or a group administrator.

The first type of member can be the group owner of the instant messaging group, the administrator of the instant messaging group, or the group owner and administrator of the instant messaging group. The embodiments of the present disclosure are illustrated by taking the group owner of the instant messaging group as an example of the first type of member.

For example, as shown in FIG. 2, the touch identifier can be displayed in the conversation interface of the group owner of the instant messaging group. The user can trigger the touch identifier by clicking, double-clicking, long pressing, and preset gestures.

Figure 5:
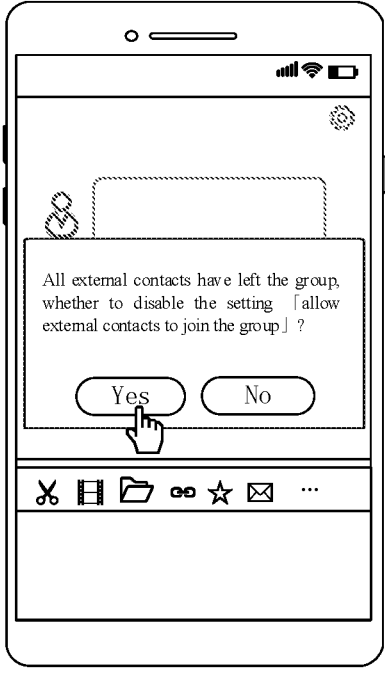
FIG. 5 illustrates a schematic diagram of a further conversation interface of an instant messaging group provided by the present disclosure.

In response to the trigger operation of the touch identifier, the attribute information of the instant messaging group can be changed. In other implementations, a pop-up window can also pop up in the conversation interface of the group owner of the instant messaging group, and the touch identifier can be displayed in the pop-up window. As shown in FIG. 5, the attribute information of the instant messaging group can be changed through the touch identifier in the touch pop-up window.

Figure 6:
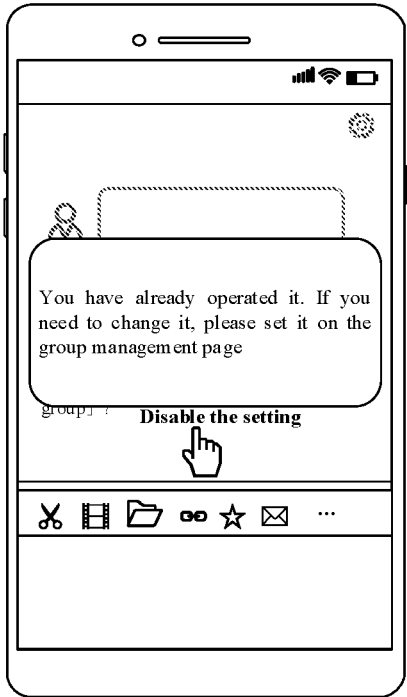
FIG. 6 illustrates a schematic diagram of a further conversation interface of an instant messaging group provided by the present disclosure.

By triggering the touch identifier, the attribute information of the instant messaging group can be changed. For example, as shown in FIG. 2, the attribute information of the instant messaging group can be changed to an internal group by triggering the touch identifier. After the attribute information of the instant messaging group is changed to an internal group, if the touch identifier is triggered again, a pop-up window will pop up in the conversation interface of the instant messaging group, and the pop-up window will display information for prompting that the touch identifier has been triggered. As shown in FIG. 6, the information displayed in the pop-up window can be "You have already operated it. If you need to change it, please set it on the group management page". The pop-up window can also be other information. This embodiment does not specifically limit the specific content displayed in the pop-up window.

It should be noted that the touch identifier can be a text touch identifier such as "off settings" as shown in FIG. 2, or a graphic touch identifier, a symbol touch mark, etc. This embodiment does not specifically limit the specific style of the touch identifier.

In this embodiment, the attribute information of the instant messaging group is changed in response to the trigger operation of the touch identifier displayed on the conversation interface of the instant messaging group corresponding to the first type of member, where the touch identifier is used for indicating that the attribute information of the instant messaging group is to be changed. The first type of member includes: a group owner and/or a group administrator. By setting the touch identifier in the conversation interface, it is possible to display the touch identifier more intuitively and facilitate the user operation.

FIG. 7 is a schematic flowchart of a further processing method for an instant messaging group provided by the present disclosure. Based on the embodiment shown in FIG. 4, before performing S101', FIG. 7 further comprises:

S201: in response to a change of members of the instant messaging group, displaying the touch identifier on the conversation interface of the instant messaging group corresponding to the first type of member in the instant messaging group.

The change of members in the instant messaging group can be leaving of an existing member in the instant messaging group or adding of a new member to the instant messaging group. For example, if some of existing members in the instant messaging group leave the group, and the remaining members in the instant messaging group belong to the same tenant, the touch identifier that can change the instant messaging group to an internal group can be displayed in the conversation interface of the group owner of the instant messaging group. For another example, if new members added to the instant messaging group belong to different tenants from existing members in the instant messaging group, the touch identifier that can change the instant messaging group to an external group can be displayed in the conversation interface of the group owner of the instant messaging group.

In this embodiment, in response to the change of members of the instant messaging group, the touch identifier is displayed on the conversation interface of the instant messaging group corresponding to the first type of member in the instant messaging group. Therefore, the touch identifier can be automatically generated based on the members in the instant messaging group without manual operation, the intelligence of changing the attribute information of the instant messaging group can be improved, and the user operation can be facilitated.

FIG. 8 is a schematic flowchart of a further processing method for an instant messaging group provided by the present disclosure. FIG. 8 is a specific description of a possible implementation when executing S201 based on the embodiment shown in FIG. 7.

S201': in response to all members of first attribute information in the instant messaging group leaving the group, displaying the touch identifier on the conversation interface of the instant messaging group corresponding to the first type of member in the instant messaging group.

The touch identifier is used for restricting members of the first attribute information from joining the group after being triggered, and the tenant to which the members of the first attribute information belong is different from the tenant to which the group owner of the instant messaging group belongs.

The members of the first attribute information and the group owner of the instant messaging group belong to different tenants, that is, the members of the first attribute information are external members in the instant messaging group. For example, the group owner in instant messaging group A belongs to tenant M, and member X of the first attribute information belongs to other tenants, then member X is an external member in instant messaging group A.

Based on the above embodiments, the original attribute information of instant messaging group A is an external group, and the members in instant messaging group A include members belonging to tenant M and members belonging to other tenants. When all members belonging to other tenants in instant messaging group A leave instant messaging group A, the touch identifier is automatically displayed in the conversation interface of the group owner of instant messaging group A, as shown in FIG. 2. In a current state, it can be triggered to convert the attribute information of instant messaging group A from an external group to an internal group.

As a specific description of a possible implementation of executing S101', as shown in FIG. 8:

S202: in response to the trigger operation on the touch identifier displayed on the conversation interface of the instant messaging group corresponding to the first type of member, changing the attribute information of the instant messaging group to an internal group.

For example, based on the above embodiments, if a user triggers a touch identifier in the conversation interface of the group owner of instant messaging group A, in response to the trigger operation on the touch identifier, the attribute information of instant messaging group A can be converted from an external group to an internal group, and the converted instant messaging group A does not allow members who do not belong to tenant M to join the group. That is to say, after instant messaging group A is converted to an internal group, only members belonging to tenant M are allowed to join the group.

In this embodiment, the original attribute information of the instant messaging group is an external group; in response to all members of the first attribute information in the instant messaging group leaving the group, the touch identifier displayed on the conversation interface of the instant messaging group corresponding to the first type of member in the instant messaging group is used to restrict members of the first attribute information from joining the group after being triggered, and the tenant to which members of the first attribute information belong is different from the tenant to which the group owner of the instant messaging group belongs; in response to the trigger operation on the touch identifier displayed on the conversation interface of the instant messaging group corresponding to the first type of member, the attribute information of the instant messaging group is changed as internal, so that when the remaining members in the instant messaging group are all internal members, the touch identifier that converts an external group into an internal group is automatically generated, thereby realizing the conversion from the external group to the internal group. Based on the above embodiment, optionally, the touch identifier is displayed in a notification message of all members of the first attribute information leaving the group.

After all external members in the instant messaging group leave the group, the remaining members in the instant messaging group are all internal members. At this time, the notification message of all external members leaving the group is displayed in the conversation message of the instant messaging group, as shown in FIG. 2. The notification message can be "All external contacts have left the group", and the notification message can further be "All external contacts have left the group. Whether to disable the setting of "Allow external contacts to join the group", as shown in FIG. 2. The touch identifier is displayed in the notification message. The notification message can also remind the user of the role of the touch identifier, enabling the user to clearly understand the role of the touch identifier and facilitating the user operation.

FIG. 9 is a schematic flowchart of a further processing method for an instant messaging group provided by the present disclosure. Based on the embodiment shown in FIG. 8, FIG. 9 further comprises:

S103: in response to the trigger operation on the touch identifier displayed on the conversation interface of the instant messaging group corresponding to the first type of member, turning off a switch button of the group management interface corresponding to the instant messaging group.

When the switch button is in the off state, members of the first attribute information are prohibited from joining the instant messaging group.

By triggering the touch identifier displayed in the conversation interface of the group owner of the instant messaging group, as shown in FIG. 2, the switch button of the group management interface corresponding to the instant messaging group can be triggered to turn off, so that the switch button of the group management interface corresponding to the instant messaging group is in the off state. At this time, external members are not allowed to join the instant messaging group.

In this embodiment, by responding to the trigger operation on the touch identifier displayed on the conversation interface of the instant messaging group corresponding to the first type of member, the switch button of the group management interface corresponding to the instant messaging group is turned off. When the switch button is in the off state, the member of the first attribute information is prohibited from joining the instant messaging group. The touch identifier can be used to touch the switch button in the group management interface, reducing the operation steps and facilitating user operation.

FIG. 10 is a schematic flowchart of a further processing method for an instant messaging group provided by the present disclosure. FIG. 10 is a specific description of a possible implementation when performing S101' based on the embodiment shown in FIG. 4.

S301: in response to the trigger operation on the touch identifier displayed on the conversation interface of the instant messaging group corresponding to the first type of member, determining whether the instant messaging group includes a member of the first attribute information.

If yes, performing S302; if not, performing S303.

In the conversation interface corresponding to the group owner of the instant messaging group, there is a certain time difference between the time when the touch identifier is triggered and the time when the touch identifier is displayed. The original attribute information of the instant messaging group is an external group. During this period, some external members may join the instant messaging group. Therefore, it is necessary to determine whether all members in the current instant messaging group are internal members after triggering the touch identifier, so as to determine whether the instant messaging group meets the condition for changing the attribute information from an external group to an internal group.

For example, instant messaging group A is an external group, and the internal members in instant messaging group A are members belonging to tenant M. After triggering the touch identifier, if external members are included in instant messaging group A, it means that during the time period when the touch identifier is triggered and displayed, external members join instant messaging group A; if external members are not included in instant messaging group A, it means that no external members join instant messaging group A during the time period when the touch identifier is triggered and displayed.

S302: prompting to removing the member of the first attribute information.

Based on the above embodiment, if external members are included in instant messaging group A, it will be prompted to remove the external members, and the user can trigger the removal of external members in instant messaging group A. When all external members in instant messaging group A are removed, instant messaging group A meets the condition of changing the attribute information from external group to internal group.

S303: changing the attribute information of the instant messaging group to an internal group.

Based on the above embodiments, no matter whether no external members join the instant messaging group A or an external member joins the instant messaging group A but all external members in instant messaging group A have been removed during the time period when the touch identifier is triggered and the display of the touch identifier is triggered, as long as instant messaging group A includes no external members after triggering the touch identifier, instant messaging group A meets the condition for changing the attribute information from an external group to an internal group, thereby changing the attribute information of instant messaging group A to an internal group.

In this embodiment, by responding to the trigger operation on the touch identifier displayed on the conversation interface of the instant messaging group corresponding to the first type of member, it is determined whether the instant messaging group includes members with the first attribute information. If not, the attribute information of the instant messaging group is changed to an internal group. If yes, it is prompted to remove the member with the first attribute information. By confirming the attribute information of the members in the instant messaging group before changing the attribute information of the instant messaging group, it is possible to improve the accuracy of changing the attribute information of the instant messaging group.

Figure 11:
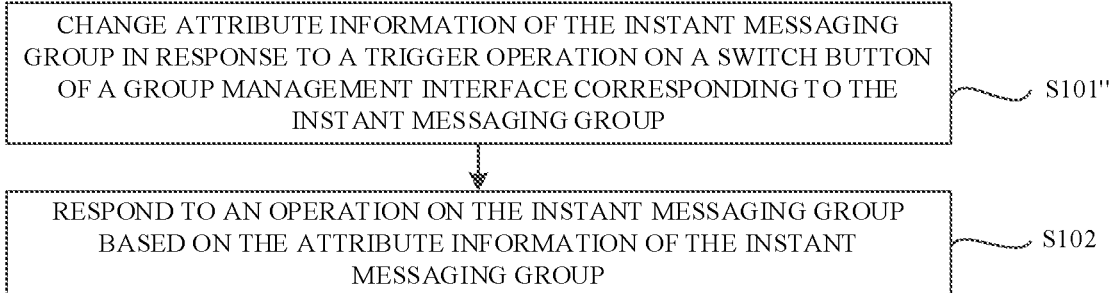
FIG. 11 illustrates a schematic flowchart of a further processing method for an instant messaging group provided by the present disclosure.

FIG. 11 is a schematic flowchart of a further processing method for an instant messaging group provided by the present disclosure. FIG. 11 is a specific description of a further possible implementation when performing S101 based on the embodiment shown in FIG. 1.

S101': in response to the trigger operation ON the switch button of the group management interface corresponding to the instant messaging group, changing the attribute information of the instant messaging group.

The switch button is used for indicating that the attribute information of the instant messaging group is to be changed.

For example, a group management control is displayed in the conversation interface of the instant messaging group, as shown in the upper right corner of FIG. 2. The display of the group management interface is triggered by triggering the group management control. The group management interface, as shown in FIG. 3, displays a switch button and can also display prompt information of the switch button. For example, the prompt information of the switch button, as shown in FIG. 3, can be "Allow external contacts to join the group" to prompt the role of the switch button. In other implementations, the display of the group management interface can further be triggered by preset gestures. This embodiment does not specifically limit the trigger method of the display group management interface.

If the switch button is turned on, as shown in FIG. 3, the instant messaging group allows external contacts to join the group, that is, the current attribute information of the instant messaging group is an external group; if the switch button is turned off, the instant messaging group does not allow external contacts to join the group, that is, the current attribute information of the instant messaging group is an internal group, and the current attribute information of the instant messaging group can be changed depending on whether the switch button is turned on.

In this embodiment, the attribute information of the instant messaging group is changed in response to the trigger operation on the switch button of the group management interface corresponding to the instant messaging group, wherein the switch button is used for indicating that the attribute information of the instant messaging group is to be changed. The switch button is displayed in the group management interface corresponding to the instant messaging group, which will not affect the content presented on the conversation interface of the instant messaging group. Further, the simplicity of the conversation interface is maintained, which helps to improve the user experience.

Figure 12:
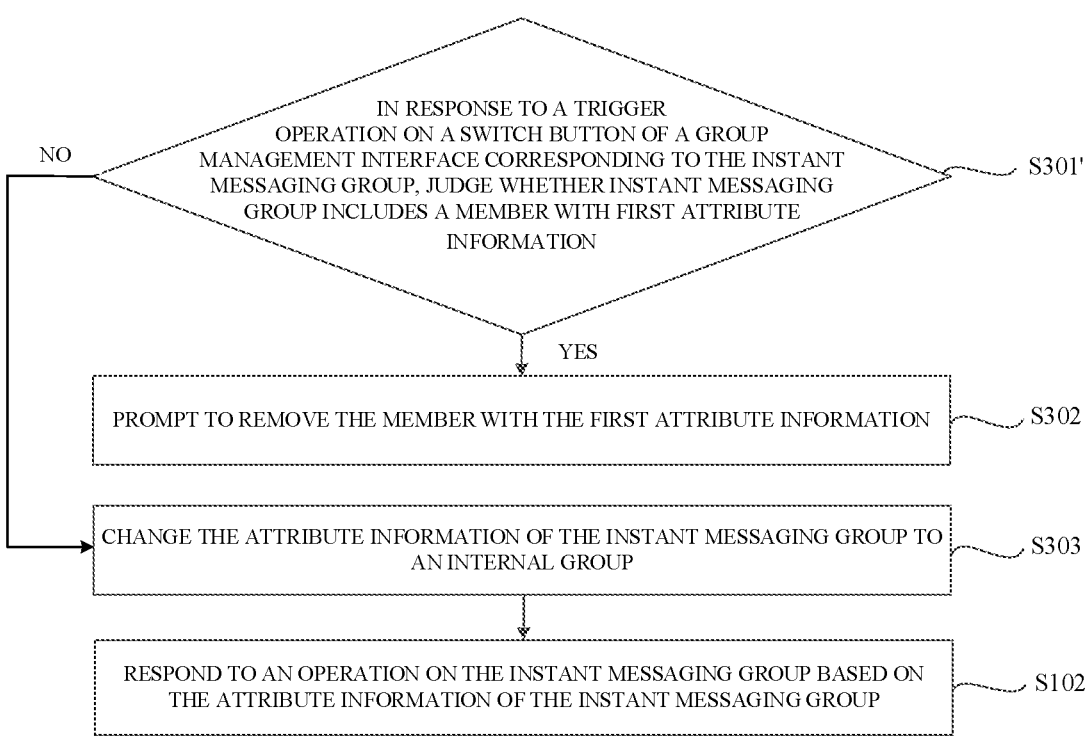
FIG. 12 illustrates a schematic flowchart of a further processing method for an instant messaging group provided by the present disclosure.

FIG. 12 is a schematic flowchart of a further processing method for an instant messaging group provided by the present disclosure. FIG. 12 is a specific description of a possible implementation when performing S101' based on the embodiment shown in FIG. 11.

S301': in response to the trigger operation on the switch button of the group management interface corresponding to the instant messaging group, determining whether the instant messaging group includes members of the first attribute information.

If yes, performing S302; if not, performing S303.

The original attribute information of the instant messaging group is an external group. After triggering the switch button, it is necessary to determine whether all members in the current instant messaging group are internal members, so as to determine whether the instant messaging group meets the condition for changing attribute information from an external group to an internal group. For example, if instant messaging group A is an external group, if there are external members in instant messaging group A, it means that instant messaging group A does not meet the condition for changing attribute information from an external group to an internal group; if there are no external members in instant messaging group A, it means that instant messaging group A meets the condition for changing attribute information from an external group to an internal group.

S302: prompting to remove the member of the first attribute information.

Based on the above embodiment, if instant messaging group A includes external members, it will be prompted to remove the external members, and the user can trigger the removal of external members in instant messaging group A. When all external members in instant messaging group A are removed, instant messaging group A meets the condition for changing attribute information from external group to internal group.

S303: changing the attribute information of the instant messaging group to an internal group.

Based on the above embodiment, after the switch button is triggered, if instant messaging group A includes no external members, the condition for changing attribute information from an external group to an internal group is met, so the attribute information of the communication group A can be changed to an internal group.

In this embodiment, by responding to the trigger operation on the switch button of the group management interface corresponding to the instant messaging group, it is determined whether the instant messaging group includes members with the first attribute information. If not, the attribute information of the instant messaging group is changed to an internal group. If yes, it is prompted to remove the member with the first attribute information. Before changing the attribute information of the instant messaging group, the attribute information of the members in the instant messaging group is confirmed, which can improve the accuracy of changing the attribute information of the instant messaging group.

Figure 13:
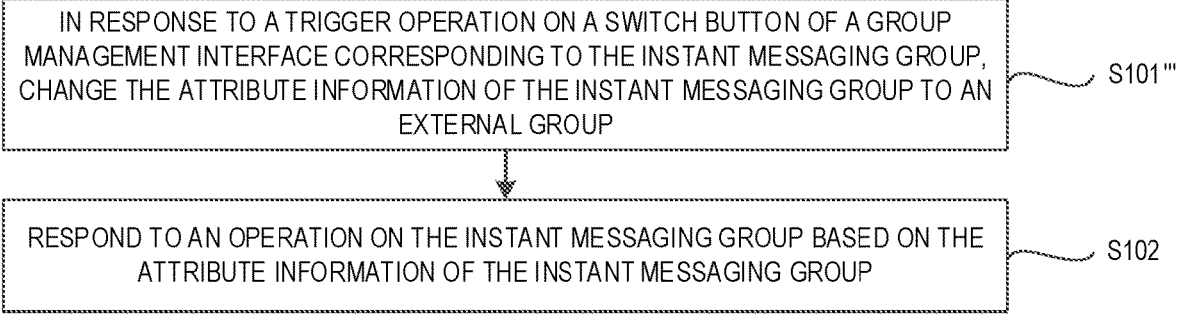
FIG. 13 illustrates a schematic flowchart of a further processing method for an instant messaging group provided by the present disclosure.

FIG. 13 is a schematic flowchart of a further processing method for an instant messaging group provided by the present disclosure. FIG. 13 is a specific description of another possible implementation when performing S101' based on the embodiment shown in FIG. 11.

S101': in response to the trigger operation on the switch button of the group management interface corresponding to the instant messaging group, changing the attribute information of the instant messaging group to an external group.

The original attribute information of the instant messaging group is an internal group, and accordingly, the switch button of the group management interface corresponding to the instant messaging group is in the off state. By triggering the switch button, the switch button is switched from the off state to the on state, and the attribute information of the instant messaging group can be changed from an internal group to an external group.

In this embodiment, the original attribute information of the instant messaging group is an internal group, and in response to the trigger operation on the switch button of the group management interface corresponding to the instant messaging group, the attribute information of the instant messaging group is changed to an external group, which can convert the instant messaging group from an internal group to an external group.

Figure 14:
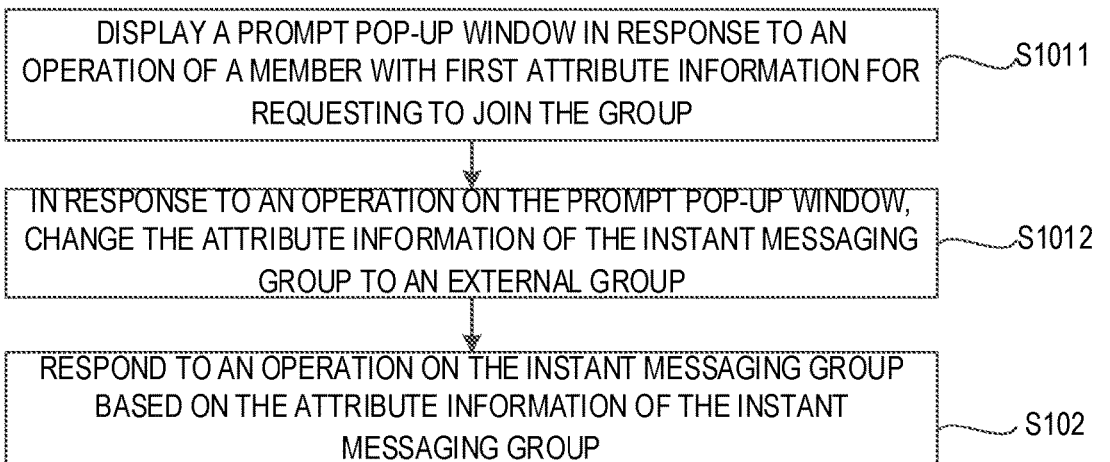
FIG. 14 illustrates a schematic flowchart of a further processing method for an instant messaging group provided by the present disclosure.

FIG. 14 is a schematic flowchart of a further processing method for an instant messaging group provided by the present disclosure. FIG. 14 is a specific description of a further possible implementation when performing S101 based on the embodiment shown in FIG. 1.

S1011: in response to a request of a member of the first attribute information to join the group, displaying a prompt pop-up window.

The prompt pop-up window is used for prompting to change the attribute information of the instant messaging group, where the tenant to which the member of the first attribute information belongs is different from the tenant to which the group owner of the instant messaging group belongs.

The original attribute information of the instant messaging group is an internal group. External members trigger the operation of requesting to join the instant messaging group. A prompt pop-up window is displayed in the conversation interface of the group owner of the instant messaging group, as shown in FIG. 15. The prompt pop-up window displays prompt information to change the attribute information of the instant messaging group. As shown in FIG. 15, according to the prompt information in the prompt pop-up window, the attribute information of the instant messaging group can be triggered to be changed from an internal group to an external group.

As an example, the prompt information in the prompt pop-up window is as shown in FIG. 15, which can be "Agree to join this group and set this group as an external group". This embodiment does not specifically limit the specific content of the prompt information in the prompt pop-up window.

S1012: in response to the operation on the prompt pop-up window, changing the attribute information of the instant messaging group to an external group.

Optionally, the prompt pop-up window also displays an option to change the attribute information of the instant messaging group from an internal group to an external group. By triggering this option, as shown in FIG. 15, the attribute information of the instant messaging group can be changed from an internal group to an external group.

Optionally, the prompt pop-up window can also display information and corresponding options for creating a new external group. As shown in FIG. 15, by selecting the option to create a new external group, an instant messaging group with attribute information for an external group can be created, so that the attribute information of the instant messaging group and the attribute information of members in the instant messaging group can be flexibly set according to actual needs.

In this embodiment, in response to the request of the member of the first attribute information to join the group operation, a prompt pop-up window is displayed, and the prompt pop-up window is used for prompting to change the attribute information of the instant messaging group, where the tenant to which the member of the first attribute information belongs is different from the tenant to which the group owner of the instant messaging group belongs; in response to the operation on the prompt pop-up window, the attribute information of the instant messaging group is changed to an external group. The prompt pop-up window is automatically generated based on the operation of external members requesting to join the group, and the attribute information of the instant messaging group can be changed based on the prompt pop-up window operation, which helps to improve the intelligence of changing the attribute information of the instant messaging group and facilitates user operation.

FIG. 16 is a schematic flowchart of a further processing method for an instant messaging group provided by the present disclosure. Based on the embodiment shown in FIG. 14, FIG. 16 further comprises:

S104, in response to an operation on the prompt pop-up window, turning on the switch button of the group management interface corresponding to the instant messaging group.

When the switch button is turned on, members of the first attribute information are allowed to join the instant messaging group.

By triggering the prompt pop-up window displayed in the conversation interface of the instant messaging group, as shown in FIG. 15, the switch button that turns on the group management interface corresponding to the instant messaging group can be triggered, so that the switch button of the group management interface corresponding to the instant messaging group is in the on state. At this time, external members are allowed to join the instant messaging group.

In this embodiment, by responding to the operation on the prompt pop-up window, the switch button of the group management interface corresponding to the instant messaging group is turned on. When the switch button is in the on state, members of the first attribute information are allowed to join the instant messaging group. The touch of the switch button in the group management interface can be realized through the prompt pop-up window, reducing the operation steps and facilitating user operation.

FIG. 17 is a schematic flowchart of a further processing method for an instant messaging group provided by the present disclosure. FIG. 17 is a specific description of a possible implementation when performing S1012 based on the embodiment shown in FIG. 14.

S401: in response to an operation on the prompt pop-up window, determining whether the instant messaging group includes virtual robot members.

If yes, performing S402; if not, performing S403.

When the attribute information of an instant messaging group is an external group, the instant messaging group does not include virtual robot members, such as Webhook robots. The original attribute information of the instant messaging group is an internal group. Before changing the attribute information of the instant messaging group from an internal group to an external group, it is necessary to confirm whether the instant messaging group includes the virtual robot members, thereby determining whether the instant messaging group meets the condition for changing the attribute information from an internal group to an external group.

S402: prompting to remove the virtual robot members of the instant messaging group.

Based on the above embodiments, if the instant messaging group includes virtual robot members, a pop-up box will pop up and ask whether to remove the virtual robot members. The user can trigger the option to remove the virtual robot members in the instant messaging group until the instant messaging group does not include virtual robot members, and the instant messaging group meets the condition for changing attribute information from an internal group to an external group.

S403: changing the attribute information of the instant messaging group to an external group.

If the instant messaging group does not include virtual robot members, the instant messaging group meets the condition for changing the attribute information from an internal group to an external group, so the attribute information of the instant messaging group can be changed to an external group.

Embodiments of the present disclosure further provides a processing apparatus for an instant messaging group. FIG. 18 is a schematic structural diagram of a processing apparatus for an instant messaging group according to the present disclosure, As shown in FIG. 18, the processing apparatus 100 including:

a changing module 110, used for changing attribute information of the instant messaging group in response to a trigger operation on the instant messaging group; wherein the attribute information of the instant messaging group comprises: an internal group and an external group; the changing attribute information of the instant messaging group comprises: converting an internal group to an external group, or converting an external group to an internal group.

A responding module 120 is used for responding to an operation on the instant messaging group based on the attribute information of the instant messaging group.

optionally, the changing module 110 is further used for in response to a trigger operation on a touch identifier displayed in a conversation interface of the instant messaging group corresponding to a first type of member, changing the attribute information of the instant messaging group, wherein the touch identifier is used for indicating that the attribute information of the instant messaging group is to be changed, the first type of member comprising: a group owner and/or group administrators.

Optionally, the apparatus further includes:

a displaying module, used for in response to a change of members in the instant messaging group, displaying the touch identifier in a conversation interface of the instant messaging group corresponding to a first type of member in the instant messaging group.

Optionally, the original attribute information of the instant messaging group is an external group.

The displaying module is further configured for in response to all members with first attribute information in the instant messaging group leaving the group, displaying the touch identifier in a conversation interface of the instant messaging group corresponding to a first type of member in the instant messaging group, the touch identifier being used for restricting the member with the first attribute information from joining the group after being triggered, a tenant to which the member with the first attribute information belongs being different from a tenant to which the group owner of the instant messaging group belongs.

The changing module 110 is further configured for changing the attribute information of the instant messaging group to an internal group in response to a trigger operation on a touch identifier displayed in a conversation interface of the instant messaging group corresponding to a first type of member.

Optionally, the touch identifier is displayed in a notification message reading that all members with the first attribute information leave the group.

Optionally, the changing module 110 is further configured for in response to a trigger operation on a touch identifier displayed in a conversation interface of the instant messaging group corresponding to a first type of member, turning off a switch button of a group management interface corresponding to the instant messaging group, members with the first attribute information being prohibited from joining the instant messaging group when the switch button is in an off state.

Optionally, the original attribute information of the instant messaging group is an external group.

The changing module 110 is further used for in response to a trigger operation on a touch identifier displayed in a conversation interface of the instant messaging group corresponding to a first type of member, judging whether the instant messaging group includes a member with the first attribute information, if not, changing the attribute information of the instant messaging group to an internal group, if yes, prompting to remove the member with the first attribute information.

Optionally, the changing module 110 is further used for in response to a trigger operation on a switch button of a group management interface corresponding to the instant messaging group, changing the attribute information of the instant messaging group, wherein the switch button is used for indicating that the attribute information of the instant messaging group is to be changed.

Optionally, the original attribute information of the instant messaging group is an external group.

The changing module 110 is further used for in response to a trigger operation on a switch button of a group management interface corresponding to the instant messaging group, judging whether the instant messaging group includes a member with the first attribute information, if not, changing the attribute information of the instant messaging group to an internal group, if yes, prompting to remove the member with the first attribute information.

Optionally, original attribute information of the instant messaging group is an internal group.

The changing module 110 is further used for changing the attribute information of the instant messaging group to an external group in response to a trigger operation on a switch button of a group management interface corresponding to the instant messaging group.

Optionally, original attribute information of the instant messaging group is an internal group.

The apparatus further includes:

a displaying module, used for in response to an operation of a member with first attribute information for requesting to join the group, displaying a prompt pop-up window, the prompt pop-up window being used for prompting to change the attribute information of the instant messaging group, wherein a tenant to which the member with the first attribute information belongs is different from a tenant to which the group owner of the instant messaging group.

The changing module 110 is further used for in response to an operation on the prompt pop-up window, changing the attribute information of the instant messaging group to an external group.

Optionally, the changing module 110 is further used for in response to the operation on the prompt pop-up window, turning on a switch button of a group management interface corresponding to the instant messaging group, the member with the first attribute information being allowed to join the instant messaging group when the switch button is in an on state.

Optionally, the changing module 110 is further used for in response to an operation on the prompt pop-up window, judging whether the instant messaging group includes a virtual robot member, if not, changing the attribute information of the instant messaging group to an external group, if yes, prompting to remove the virtual robot member in the instant messaging group.

Apparatus of the present embodiment may be used to perform the corresponding technical solutions of the above-described embodiments, similar to the implementation principle and technical effect, not described herein.

The present disclosure also provides an electronic device, comprising: a processor, the processor for executing a computer program stored in a memory, the computer program is executed by the processor to implement the steps of the method of the above embodiments.

The present disclosure also provides a computer-readable storage medium having a computer program stored thereon, the computer program, when executed by a processor, implementing the steps of the method of the above embodiments.

The present disclosure also provides a computer program product, when the computer program product is run on a computer, causing the computer to perform the steps of the methods described in the above embodiments.

In a first aspect, the present disclosure provides a processing method for an instant messaging group, comprising:

changing attribute information of the instant messaging group in response to a trigger operation on the instant messaging group; wherein the attribute information of the instant messaging group comprises: an internal group and an external group; the changing attribute information of the instant messaging group comprises: converting an internal group to an external group, or converting an external group to an internal group; responding to an operation on the instant messaging group based on the attribute information of the instant messaging group.

Optionally, the changing attribute information of the instant messaging group in response to a trigger operation on the instant messaging group comprises: in response to a trigger operation on a touch identifier displayed in a conversation interface of the instant messaging group corresponding to a first type of member, changing the attribute information of the instant messaging group, wherein the touch identifier is used for indicating that the attribute information of the instant messaging group is to be changed, the first type of member comprising: a group owner and/or group administrators.

Optionally, before changing the attribute information of the instant messaging group corresponding to a first type of member in response to a trigger operation on a touch identifier displayed in a conversation interface of the instant messaging group corresponding to a first type of member, further comprises: in response to a change of members in the instant messaging group, displaying the touch identifier in a conversation interface of the instant messaging group corresponding to a first type of member in the instant messaging group.

Optionally, original attribute information of the instant messaging group is an external group; the in response to a change of members in the instant messaging group, displaying the touch identifier in a conversation interface of the instant messaging group corresponding to a first type of member in the instant messaging group comprises: in response to all members with first attribute information in the instant messaging group leaving the group, displaying the touch identifier in a conversation interface of the instant messaging group corresponding to a first type of member in the instant messaging group, the touch identifier being used for restricting the member with the first attribute information from joining the group after being triggered, a tenant to which the member with the first attribute information belongs being different from a tenant to which the group owner of the instant messaging group belongs; the changing the attribute information of the instant messaging group in response to a trigger operation on a touch identifier displayed in a conversation interface of the instant messaging group corresponding to a first type of member comprises: changing the attribute information of the instant messaging group to an internal group in response to a trigger operation on a touch identifier displayed in a conversation interface of the instant messaging group corresponding to a first type of member.

Optionally, the touch identifier is displayed in a notification message reading that all members with the first attribute information leave the group.

Optionally, the method further comprises: in response to a trigger operation on a touch identifier displayed in a conversation interface of the instant messaging group corresponding to a first type of member, turning off a switch button of a group management interface corresponding to the instant messaging group, members with the first attribute information being prohibited from joining the instant messaging group when the switch button is in an off state.

Optionally, the original attribute information of the instant messaging group is an external group; the changing the attribute information of the instant messaging group in response to a trigger operation on a touch identifier displayed in a conversation interface of the instant messaging group corresponding to a first type of member comprises: in response to a trigger operation on a touch identifier displayed in a conversation interface of the instant messaging group corresponding to a first type of member, judging whether the instant messaging group includes a member with the first attribute information, if not, changing the attribute information of the instant messaging group to an internal group, if yes, prompting to remove the member with the first attribute information.

Optionally, the changing attribute information of the instant messaging group in response to a trigger operation on the instant messaging group comprises: in response to a trigger operation on a switch button of a group management interface corresponding to the instant messaging group, changing the attribute information of the instant messaging group, wherein the switch button is used for indicating that the attribute information of the instant messaging group is to be changed.

Optionally, original attribute information of the instant messaging group is an external group; the changing the attribute information of the instant messaging group in response to a trigger operation on a switch button of a group management interface corresponding to the instant messaging group comprises: in response to a trigger operation on a switch button of a group management interface corresponding to the instant messaging group, judging whether the instant messaging group includes a member with the first attribute information, if not, changing the attribute information of the instant messaging group to an internal group, if yes, prompting to remove the member with the first attribute information.

Optionally, original attribute information of the instant messaging group is an internal group; the changing the attribute information of the instant messaging group in response to a trigger operation on a switch button of a group management interface corresponding to the instant messaging group comprises: changing the attribute information of the instant messaging group to an external group in response to a trigger operation on a switch button of a group management interface corresponding to the instant messaging group.

Optionally, original attribute information of the instant messaging group is an internal group; the changing attribute information of the instant messaging group in response to a trigger operation on the instant messaging group comprises: in response to an operation of a member with first attribute information for requesting to join the group, displaying a prompt pop-up window, the prompt pop-up window being used for prompting to change the attribute information of the instant messaging group, wherein a tenant to which the member with the first attribute information belongs is different from a tenant to which the group owner of the instant messaging group; in response to an operation on the prompt pop-up window, changing the attribute information of the instant messaging group to an external group.

Optionally, the method further comprises: in response to the operation on the prompt pop-up window, turning on a switch button of a group management interface corresponding to the instant messaging group, the member with the first attribute information being allowed to join the instant messaging group when the switch button is in an on state.

Optionally, the changing the attribute information of the instant messaging group to an external group in response to an operation on the prompt pop-up window comprises: in response to an operation on the prompt pop-up window, judging whether the instant messaging group includes a virtual robot member, if not, changing the attribute information of the instant messaging group to an external group, if yes, prompting to remove the virtual robot member in the instant messaging group.

In a second aspect, the present disclosure provides a processing apparatus for an instant messaging group, including:

a changing module, used for changing attribute information of the instant messaging group in response to a trigger operation on the instant messaging group;

wherein the attribute information of the instant messaging group comprises: an internal group and an external group; the changing attribute information of the instant messaging group comprises: converting an internal group to an external group, or converting an external group to an internal group.

A responding module is used for responding to an operation on the instant messaging group based on the attribute information of the instant messaging group.

optionally, the changing module is further used for in response to a trigger operation on a touch identifier displayed in a conversation interface of the instant messaging group corresponding to a first type of member, changing the attribute information of the instant messaging group, wherein the touch identifier is used for indicating that the attribute information of the instant messaging group is to be changed, the first type of member comprising: a group owner and/or group administrators.

Optionally, the apparatus further includes:

a displaying module, used for in response to a change of members in the instant messaging group, displaying the touch identifier in a conversation interface of the instant messaging group corresponding to a first type of member in the instant messaging group.

Optionally, the original attribute information of the instant messaging group is an external group.

The displaying module is further configured for in response to all members with first attribute information in the instant messaging group leaving the group, displaying the touch identifier in a conversation interface of the instant messaging group corresponding to a first type of member in the instant messaging group, the touch identifier being used for restricting the member with the first attribute information from joining the group after being triggered, a tenant to which the member with the first attribute information belongs being different from a tenant to which the group owner of the instant messaging group belongs.

The changing module is further configured for changing the attribute information of the instant messaging group to an internal group in response to a trigger operation on a touch identifier displayed in a conversation interface of the instant messaging group corresponding to a first type of member.

Optionally, the touch identifier is displayed in a notification message reading that all members with the first attribute information leave the group.

Optionally, the changing module is further configured for in response to a trigger operation on a touch identifier displayed in a conversation interface of the instant messaging group corresponding to a first type of member, turning off a switch button of a group management interface corresponding to the instant messaging group, members with the first attribute information being prohibited from joining the instant messaging group when the switch button is in an off state.

Optionally, the original attribute information of the instant messaging group is an external group.

The changing module is further used for in response to a trigger operation on a touch identifier displayed in a conversation interface of the instant messaging group corresponding to a first type of member, judging whether the instant messaging group includes a member with the first attribute information, if not, changing the attribute information of the instant messaging group to an internal group, if yes, prompting to remove the member with the first attribute information.

Optionally, the changing module is further used for in response to a trigger operation on a switch button of a group management interface corresponding to the instant messaging group, changing the attribute information of the instant messaging group, wherein the switch button is used for indicating that the attribute information of the instant messaging group is to be changed.

Optionally, the original attribute information of the instant messaging group is an external group.

The changing module is further used for in response to a trigger operation on a switch button of a group management interface corresponding to the instant messaging group, judging whether the instant messaging group includes a member with the first attribute information, if not, changing the attribute information of the instant messaging group to an internal group, if yes, prompting to remove the member with the first attribute information.

Optionally, original attribute information of the instant messaging group is an internal group.

The changing module is further used for changing the attribute information of the instant messaging group to an external group in response to a trigger operation on a switch button of a group management interface corresponding to the instant messaging group.

Optionally, original attribute information of the instant messaging group is an internal group.

The apparatus further includes:

a displaying module, used for in response to an operation of a member with first attribute information for requesting to join the group, displaying a prompt pop-up window, the prompt pop-up window being used for prompting to change the attribute information of the instant messaging group, wherein a tenant to which the member with the first attribute information belongs is different from a tenant to which the group owner of the instant messaging group.

The changing module is further used for in response to an operation on the prompt pop-up window, changing the attribute information of the instant messaging group to an external group.

Optionally, the changing module is further used for in response to the operation on the prompt pop-up window, turning on a switch button of a group management interface corresponding to the instant messaging group, the member with the first attribute information being allowed to join the instant messaging group when the switch button is in an on state.

Optionally, the changing module is further used for in response to an operation on the prompt pop-up window, judging whether the instant messaging group includes a virtual robot member, if not, changing the attribute information of the instant messaging group to an external group, if yes, prompting to remove the virtual robot member in the instant messaging group.

In a third aspect, the present disclosure provides an electronic device, comprising: a processor for executing a computer program stored in a memory, the computer program being executed by the processor to implement the steps of the first aspect.

In a fourth aspect, the present disclosure provides a computer-readable storage medium having a computer program stored thereon, characterized in that the computer program, when executed by a processor, implements the steps of any of the first aspects.

In a fifth aspect, the present disclosure provides a computer program product, characterized in that, when the computer program product is run on a computer, causes the computer to perform steps of implementing the method of any of the first aspects.

It should be noted that in this article, relational terms such as "first" and "second" are only used to distinguish one entity or operation from another entity or operation, and do not necessarily require or imply any actual relationship or order between these entities or operations. Moreover, the terms "including", "comprising", or any other variant thereof are intended to cover non-exclusive inclusion, so that a process, method, object, or device that includes a series of elements not only includes those elements, but also includes other elements not explicitly listed, or includes elements inherent to such a process, method, object, or device. In the absence of further limitations, the element defined by the sentence "including a . . . " does not exclude the existence of additional identical elements in the process, method, object, or device that includes the element.

The above is only a detailed description of the present disclosure, which enables those skilled in the art to understand or implement the present disclosure. Various modifications to these embodiments will be apparent to those skilled in the art, and the general principles defined herein can be implemented in other embodiments without departing from the spirit or scope of the present disclosure. Therefore, the present disclosure will not be limited to these embodiments described herein, but will conform to the widest scope consistent with the principles and novel features disclosed herein.

What is claimed is:

1. A method for processing an instant messaging group, comprising:
    changing attribute information of the instant messaging group in response to a trigger operation on the instant messaging group;
    wherein the attribute information of the instant messaging group comprises: an internal group and an external group; the changing attribute information of the instant messaging group comprises: converting an internal group to an external group, or converting an external group to an internal group; and responding to an operation on the instant messaging group based on the attribute information of the instant messaging group,
    wherein the changing attribute information of the instant messaging group in response to a trigger operation on the instant messaging group comprises:
    in response to a trigger operation on a touch identifier displayed in a conversation interface of the instant messaging group corresponding to a first type of member, changing the attribute information of the instant messaging group, wherein the touch identifier is configured to indicate that the attribute information of the instant messaging group is to be changed, and the first type of member comprises at least one of a group owner or group administrators.

2. The method according to claim 1, wherein before changing the attribute information of the instant messaging group, the method further comprises:
    in response to a change of members in the instant messaging group, displaying the touch identifier in the conversation interface of the instant messaging group corresponding to the first type of member in the instant messaging group.

3. The method according to claim 2, wherein original attribute information of the instant messaging group is an external group, the displaying the touch identifier in the conversation interface of the instant messaging group corresponding to the first type of member comprises:
    in response to all members with first attribute information in the instant messaging group leaving the group, displaying the touch identifier in the conversation interface of the instant messaging group corresponding to the first type of member, the touch identifier being used for restricting the member with the first attribute information from joining the group after being triggered, a tenant to which the member with the first attribute information belongs being different from a tenant to which the group owner of the instant messaging group belongs; and
    changing the attribute information of the instant messaging group in response to the trigger operation on the touch identifier displayed in the conversation interface of the instant messaging group corresponding to the first type of member comprises:
    changing the attribute information of the instant messaging group to an internal group in response to the trigger operation on the touch identifier displayed in the conversation interface of the instant messaging group corresponding to the first type of member.

4. The method according to claim 3, wherein the touch identifier is displayed in a notification message reading that all members with the first attribute information leave the group.

5. The method according to claim 3, further comprising:
    in response to the trigger operation on the touch identifier displayed in the conversation interface of the instant messaging group corresponding to the first type of member, turning off a switch button of a group management interface corresponding to the instant messaging group, members with the first attribute information being prohibited from joining the instant messaging group when the switch button is in an off state.

6. The method according to claim 1, wherein original attribute information of the instant messaging group is an external group; and the changing the attribute information of the instant messaging group comprises:

in response to the trigger operation on the touch identifier displayed in the conversation interface of the instant messaging group corresponding to the first type of member, determining whether the instant messaging group includes a member with first attribute information;

changing the attribute information of the instant messaging group to an internal group in response to determining that the instant messaging group does not include the member with the first attribute information; and prompting to remove the member with the first attribute information in response to determining that the instant messaging group includes the member with the first attribute information.

7. The method according to claim 1, wherein changing attribute information of the instant messaging group in response to a trigger operation on the instant messaging group comprises:

in response to a trigger operation on a switch button of a group management interface corresponding to the instant messaging group, changing the attribute information of the instant messaging group, wherein the switch button is used for indicating that the attribute information of the instant messaging group is to be changed.

8. The method according to claim 7, wherein original attribute information of the instant messaging group is an external group; and the changing the attribute information of the instant messaging group in response to a trigger operation on a switch button of a group management interface corresponding to the instant messaging group comprises:

in response to the trigger operation on the switch button of the group management interface corresponding to the instant messaging group, determining whether the instant messaging group includes a member with first attribute information;

changing the attribute information of the instant messaging group to an internal group in response to determining that the instant messaging group does not include the member with the first attribute information; and prompting to remove the member with the first attribute information in response to determining that the instant messaging group includes the member with the first attribute information.

9. The method according to claim 7, wherein original attribute information of the instant messaging group is an internal group; and the changing the attribute information of the instant messaging group in response to a trigger operation on a switch button of a group management interface corresponding to the instant messaging group comprises:

changing the attribute information of the instant messaging group to an external group in response to the trigger operation on the switch button of the group management interface corresponding to the instant messaging group.

10. The method according to claim 1, wherein original attribute information of the instant messaging group is an internal group; and the changing attribute information of the instant messaging group in response to a trigger operation on the instant messaging group comprises:

in response to an operation of a member with first attribute information for requesting to join the group, displaying a prompt pop-up window, the prompt pop-up window being used for prompting to change the attribute information of the instant messaging group, wherein a tenant to which the member with the first attribute information belongs is different from a tenant to which the group owner of the instant messaging group; and in response to an operation on the prompt pop-up window, changing the attribute information of the instant messaging group to an external group.

11. The method according to claim 10, further comprising:

in response to the operation on the prompt pop-up window, turning on a switch button of a group management interface corresponding to the instant messaging group, the member with the first attribute information being allowed to join the instant messaging group when the switch button is in an on state.

12. The method according to claim 10, wherein changing the attribute information of the instant messaging group to an external group in response to an operation on the prompt pop-up window comprises:

in response to an operation on the prompt pop-up window, judging whether the instant messaging group includes a virtual robot member, if not, changing the attribute information of the instant messaging group to an external group, if yes, prompting to remove the virtual robot member in the instant messaging group.

13. An electronic device, comprising:

a processor, a memory, configured to store a computer program;

wherein the computer program, when executed by the processor, causes the electronic device to perform operations comprising:

changing attribute information of the instant messaging group in response to a trigger operation on the instant messaging group;

wherein the attribute information of the instant messaging group comprises: an internal group and an external group; the changing attribute information of the instant messaging group comprises: converting an internal group to an external group, or converting an external group to an internal group; and responding to an operation on the instant messaging group based on the attribute information of the instant messaging group, wherein the changing attribute information of the instant messaging group in response to a trigger operation on the instant messaging group comprises:

in response to a trigger operation on a touch identifier displayed in a conversation interface of the instant messaging group corresponding to a first type of member, changing the attribute information of the instant messaging group, wherein the touch identifier is configured to indicate that the attribute information of the instant messaging group is to be changed, and the first type of member comprising at least one of a group owner or group administrators.

14. The electronic device according to claim 13, wherein before changing the attribute information of the instant messaging group, the operations further comprise:

in response to a change of members in the instant messaging group, displaying the touch identifier in the conversation interface of the instant messaging group corresponding to the first type of member in the instant messaging group.

15. The electronic device according to claim 14, wherein original attribute information of the instant messaging group is an external group, the displaying the touch identifier in the conversation interface of the instant messaging group corresponding to the first type of member comprises:

in response to all members with first attribute information in the instant messaging group leaving the group, displaying the touch identifier in the conversation interface of the instant messaging group corresponding to the first type of member, the touch identifier being used for restricting the member with the first attribute information from joining the group after being triggered, a tenant to which the member with the first attribute information belongs being different from a tenant to which the group owner of the instant messaging group belongs; and changing the attribute information of the instant messaging group in response to the trigger operation on the touch identifier displayed in the conversation interface of the instant messaging group corresponding to the first type of member comprises:

changing the attribute information of the instant messaging group to an internal group in response to the trigger operation on the touch identifier displayed in the conversation interface of the instant messaging group corresponding to the first type of member.

16. The electronic device according to claim 15, wherein the touch identifier is displayed in a notification message reading that all members with the first attribute information leave the group.

17. The electronic device according to claim 15, wherein the operations further comprise:

in response to the trigger operation on the touch identifier displayed in the conversation interface of the instant messaging group corresponding to the first type of member, turning off a switch button of a group management interface corresponding to the instant messaging group, members with the first attribute information being prohibited from joining the instant messaging group when the switch button is in an off state.

18. A non-transitory computer-readable storage medium, wherein the computer readable-storage medium stores instructions which, when executed on an electronic device, cause the electronic device to perform operations comprising:

changing attribute information of the instant messaging group in response to a trigger operation on the instant messaging group;

wherein the attribute information of the instant messaging group comprises: an internal group and an external group; the changing attribute information of the instant messaging group comprises: converting an internal group to an external group, or converting an external group to an internal group; and responding to an operation on the instant messaging group based on the attribute information of the instant messaging group, wherein the changing attribute information of the instant messaging group in response to a trigger operation on the instant messaging group comprises:

in response to a trigger operation on a touch identifier displayed in a conversation interface of the instant messaging group corresponding to a first type of member, changing the attribute information of the instant messaging group, wherein the touch identifier is configured to indicate that the attribute information of the instant messaging group is to be changed, and the first type of member comprises at least one of a group owner or group administrators.

19. The non-transitory computer-readable storage medium according to claim 18, the operations further comprising:

in response to a change of members in the instant messaging group, displaying the touch identifier in the conversation interface of the instant messaging group corresponding to the first type of member.

20. The non-transitory computer-readable storage medium according to claim 18, wherein original attribute information of the instant messaging group is an external group, and wherein the changing the attribute information of the instant messaging group comprises:

in response to the trigger operation on the touch identifier displayed in the conversation interface of the instant messaging group corresponding to the first type of member, determining whether the instant messaging group includes a member with first attribute information;

changing the attribute information of the instant messaging group to an internal group in response to determining that the instant messaging group does not include the member with the first attribute information; and prompting to remove the member with the first attribute information in response to determining that the instant messaging group includes the member with the first attribute information.

* * * * *